UNITED STATES PATENT OFFICE.

FERDINAND JOSSA, OF BOSTON, MASSACHUSETTS.

DISINFECTING COMPOUND.

SPECIFICATION forming part of Letters Patent No. 321,368, dated June 30, 1885.

Application filed September 15, 1884. (No specimens.)

*To all whom it may concern:*

Be it known that I, FERDINAND JOSSA, of Boston, in the county of Suffolk and State of Massachusetts, have invented a new and Improved Disinfecting and Deodorizing Compound, of which the following is a full, clear, and exact description.

My compound consists of the following ingredients, combined in the proportions stated, viz: sulphate of lime, (ground,) one hundred pounds; sulphate of iron, five pounds; borax, three pounds; chloride of sodium, one-half pound; bicarbonate of soda, one-half pound; water.

In preparing this compound the sulphate of iron, borax, chloride of sodium, and bicarbonate of soda are dissolved in warm water, and then thoroughly mixed with the dry sulphate of lime.

The compound when dry turns yellow, when it is passed through a sieve, and is then ready for use.

When the compound is to be used as a powder, uncalcined sulphate of lime is used; but when the compound is to be molded into hard cakes the sulphate of lime is calcined.

The compound can be used as a powder, as hard cakes, or may be mixed with water in the proportion of from five to ten gallons of water to the quantity of the compound above given, according as a stronger or weaker compound may be required.

The compound is designed to be used in all places where a disinfectant or a deodorizer is required.

Having thus described my invention, what I claim as new, and desire to secure by Letters Patent, is—

The herein-described disinfecting and deodorizing compound, consisting of sulphate of lime, sulphate of iron, borax, chloride of sodium, bicarbonate of soda, and water, in the proportions specified.

FERDINAND JOSSA.

Witnesses:
JAMES I. BROOKS,
O. A. SMITH.